Sept. 20, 1960

G. M. PFUNDT 2,953,349

CABLE LASHING MACHINE

Filed Aug. 16, 1957

INVENTOR.
George M. Pfundt,
BY
ATTORNEYS

INVENTOR.
George M. Pfundt,
BY Paul & Paul
ATTORNEYS

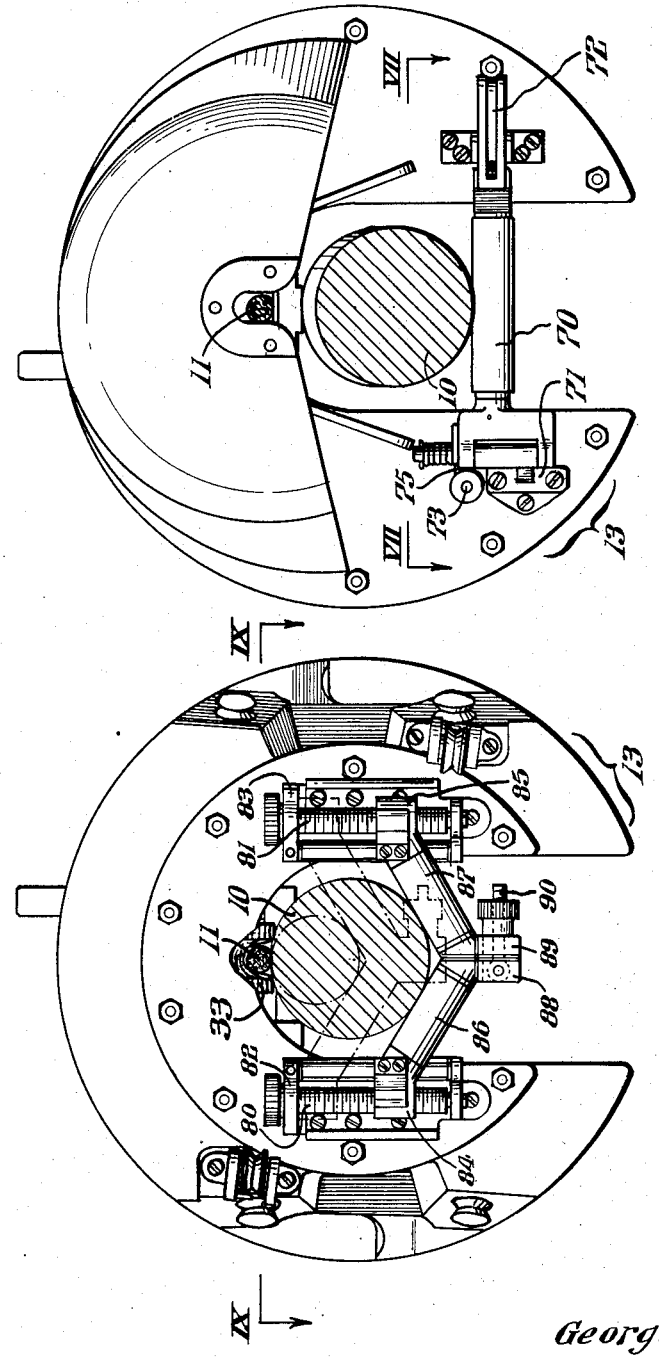

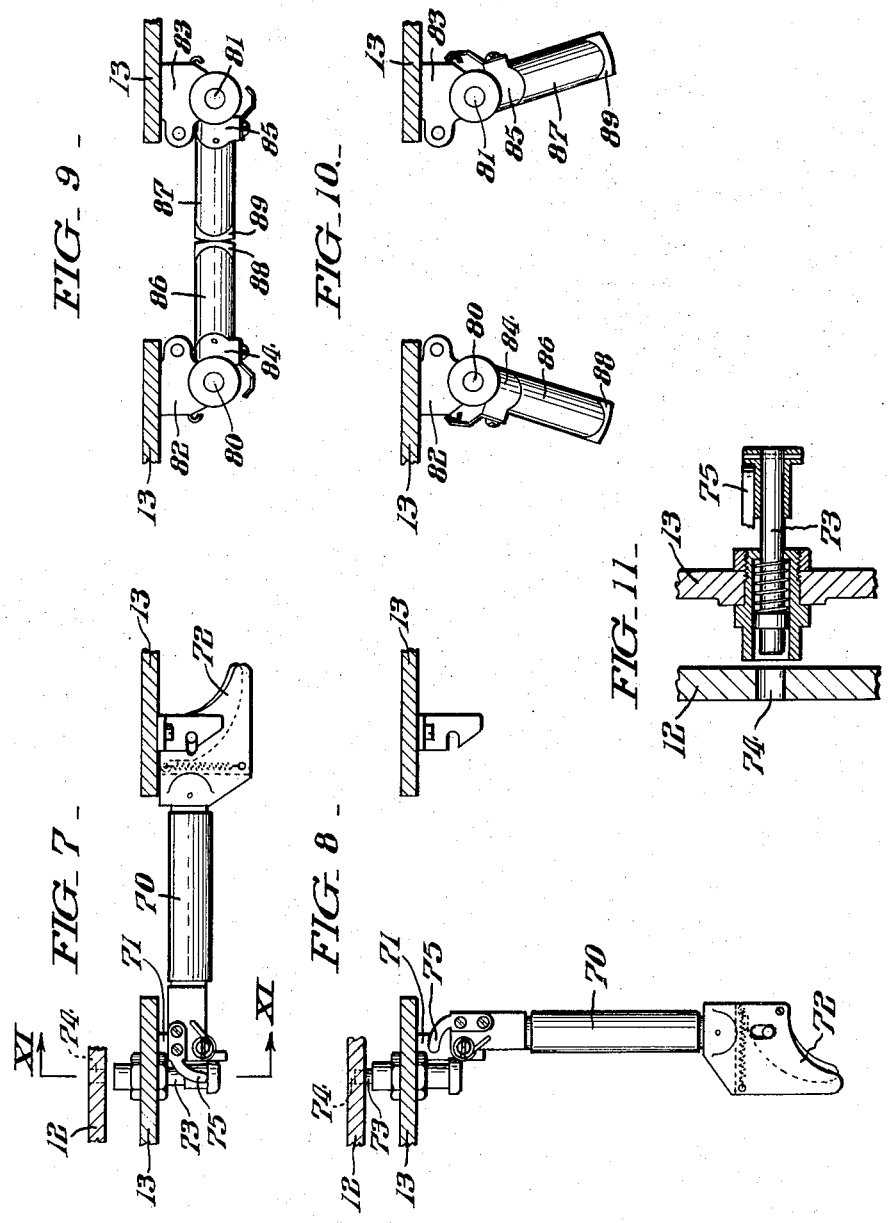

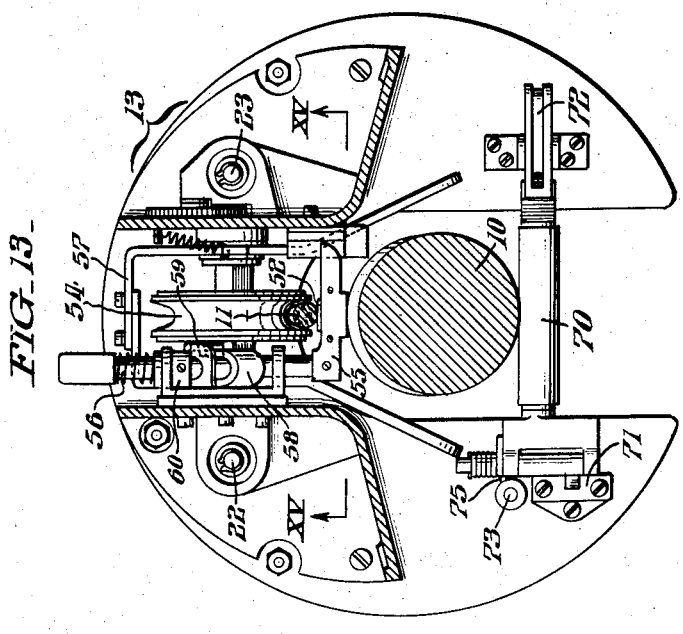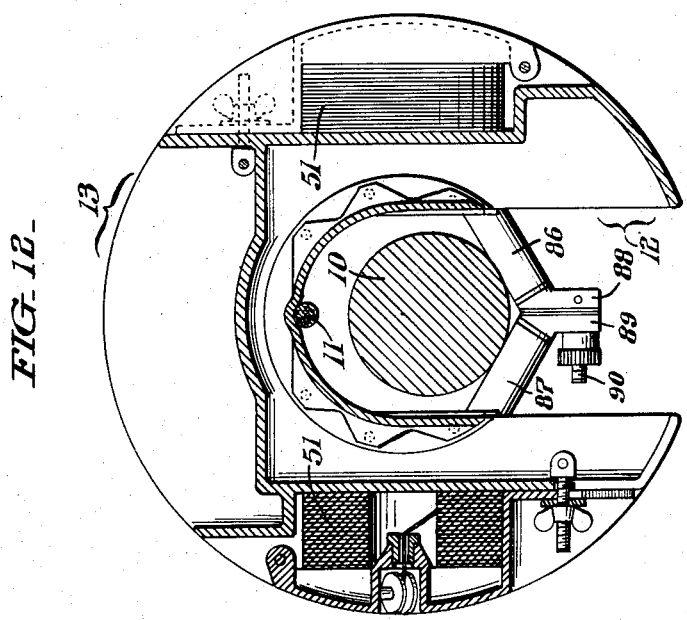

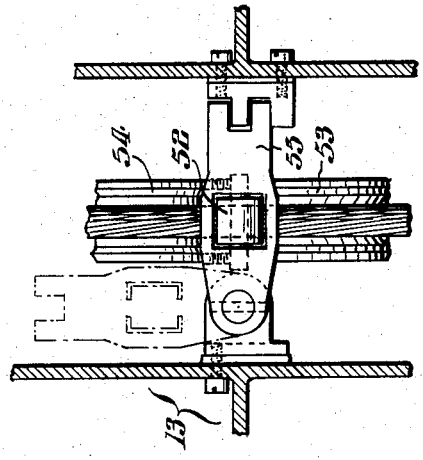
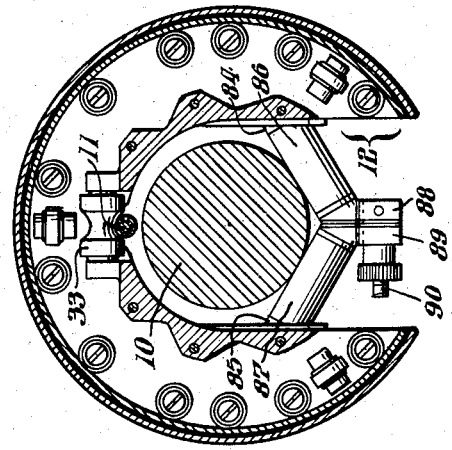

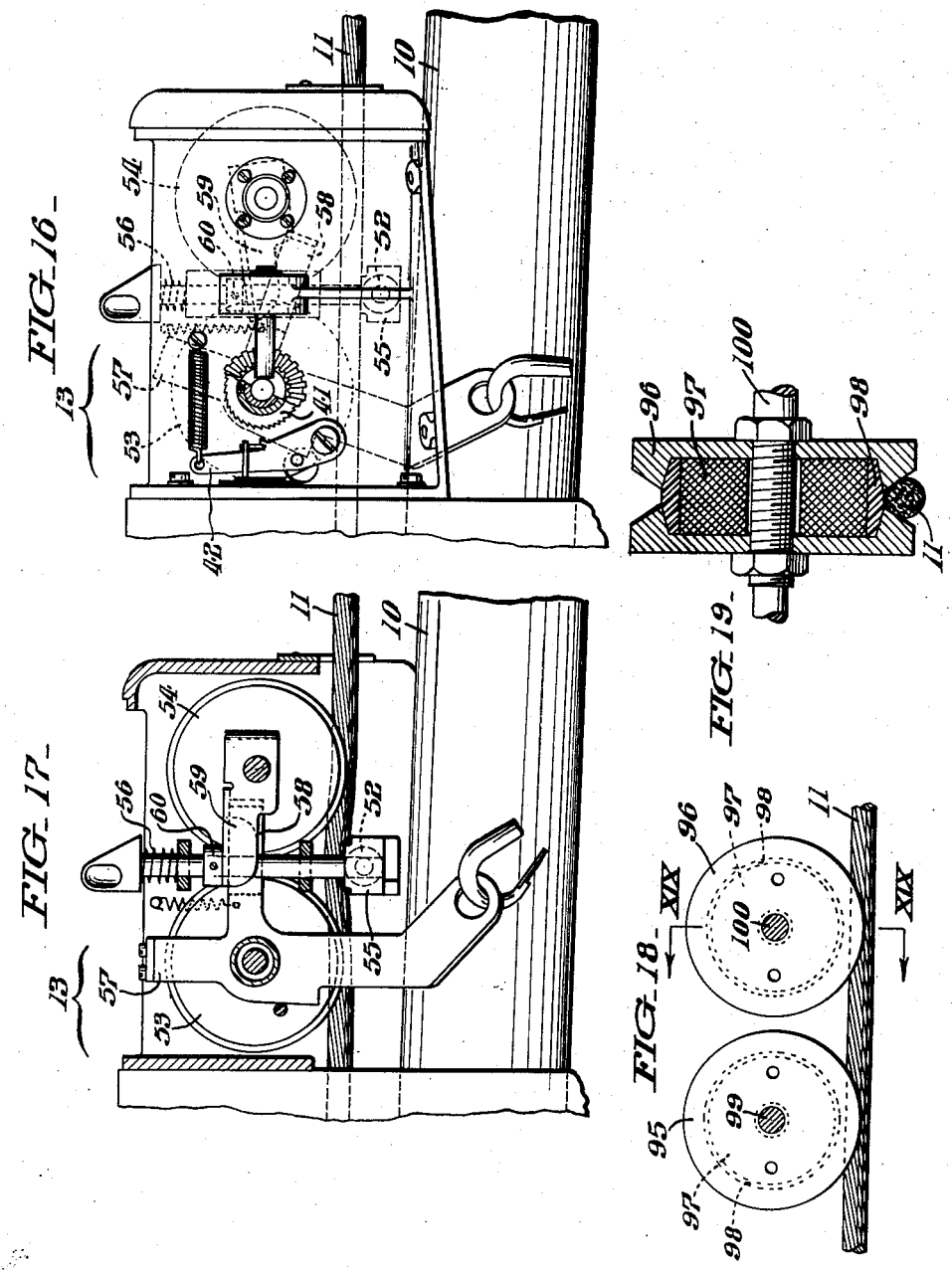

United States Patent Office 2,953,349
Patented Sept. 20, 1960

2,953,349

CABLE LASHING MACHINE

George M. Pfundt, Bustleton Pike, Churchville, Pa.

Filed Aug. 16, 1957, Ser. No. 678,585

3 Claims. (Cl. 254—134.3)

This invention relates to a cable lashing machine of the type used in tying telephone cables to supporting steel cables or strands and more particularly to improvements in the driving and supporting structure of such a machine.

Cable lashing machines of the general type here involved are illustrated in Patent No. 2,544,313, Harley, March 6, 1951, and Patent No. 2,663,544, Harley, December 22, 1953.

It is a principal purpose of this invention to provide an improved cable lashing machine in which the lay of the lashing wire is directly related to the linear travel of the machine along the supporting steel cable.

It is also an object of this invention to provide a cable lashing machine in which the driving mechanism operates in response to the linear travel of the machine along the supporting cable and in which this response is independent of the force of gravity on the machine.

It is a further object of this invention to provide a cable lashing machine having adjustable means for drawing the telephone cable into proximity with the supporting steel cable wherein the vertical position of the supporting means with respect to the machine may be easily varied.

Other objects and advantages will be apparent from the following description and drawings of which:

Fig. 5 is a view along the line V—V of Fig. 3;

Fig. 6 is a front elevation along the line VI—VI of Fig. 3;

Fig. 7 is a detailed view of the front cable lifting structure taken along the line VII—VII of Fig. 6;

Fig. 8 shows the front cable lifting structure of Fig. 7 in its open position;

Fig. 9 is a detailed view of the rear cable lifting structure taken along the line IX—IX of Fig. 5;

Fig. 10 shows the rear cable lifter of Fig. 9 in an open position;

Fig. 11 is a fragmentary view taken along the line XI—XI of Fig. 7 partly in cross-section and partly cut away of the means of preventing rotation of the drum portion of the cable lifting machine made according to the invention when the machine is not in use;

Fig. 12 is a view along the line XII—XII of Fig. 3;

Fig. 13 is a sectional view along the line XIII—XIII of Fig. 4;

Fig. 14 is a sectional view along the line XIV—XIV of Fig. 3;

Fig. 15 is a view along the line XV—XV of Fig. 13;

Fig. 16 is a view along the line XVI—XVI of Fig. 4;

Fig. 17 is a view along the line XVII—XVII of Fig. 4;

Fig. 18 is a side elevation of a modified form of driving wheel for a cable lashing machine made according to the invention;

Fig. 19 is a view along the line XIX—XIX of Fig. 18.

Figure 1:
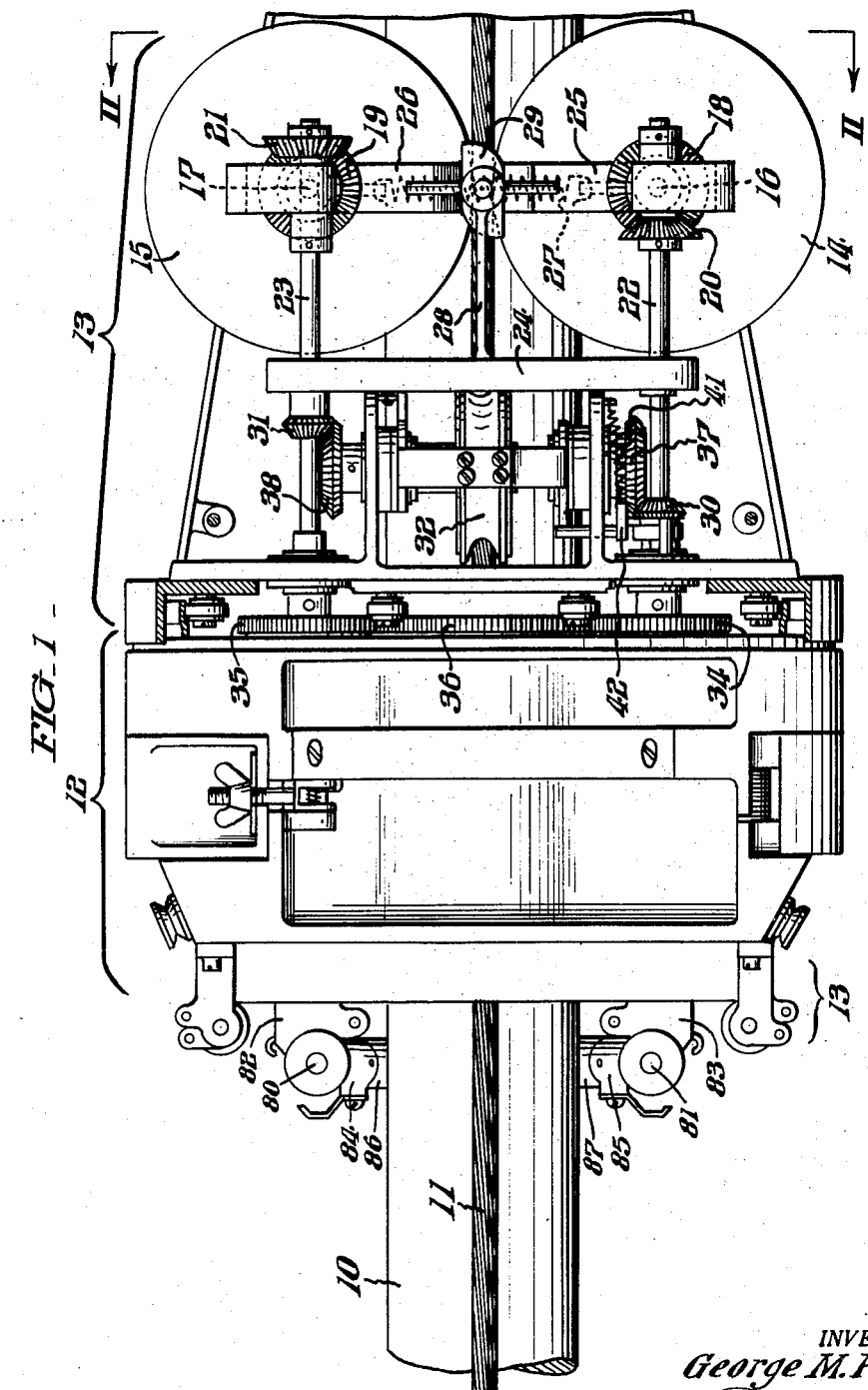
Fig. 1 is a plan view partly cut away of a cable lashing machine made in accordance with the invention.

The cable lashing machine shown in Fig. 1 includes a frame portion 13 and a drum portion 12 mounted to rotate about a portion of the frame 13. The machine is shown mounted on a steel supporting cable or strand 11, engaged in lashing the telephone cable 10 to the strand 11. The weight of the machine on the strand 11 is borne by the front supporting wheel 32 and rear supporting wheel 33, shown in Fig. 5.

The machine is provided with two front drive wheels 14 and 15 mounted on axles 16 and 17 respectively. Bevel gears 18 and 19 are rigidly affixed to the upper faces of each of the drive wheels 14 and 15 respectively and drive bevel gears 20 and 21 which in turn drive the shafts 22 and 23 causing them to rotate and thus drive spur gears 34 and 35. There spur gears 34 and 35 drive gear 36 which is affixed to the rotating drum 12 thereby causing the drum 12 to rotate about a portion of frame 13. In addition to the front drive wheels 14 and 15, supporting wheel 32 also delivers rotative power to the drum 12, through bevel gears 37 and 38 which are mounted on the same axle as supporting wheel 32. Bevel gears 37 and 38 drive spur gears 30 and 31 respectively mounted on shafts 23 and 22 thereby assisting in rotating the shafts 22 and 23.

Figure 2:
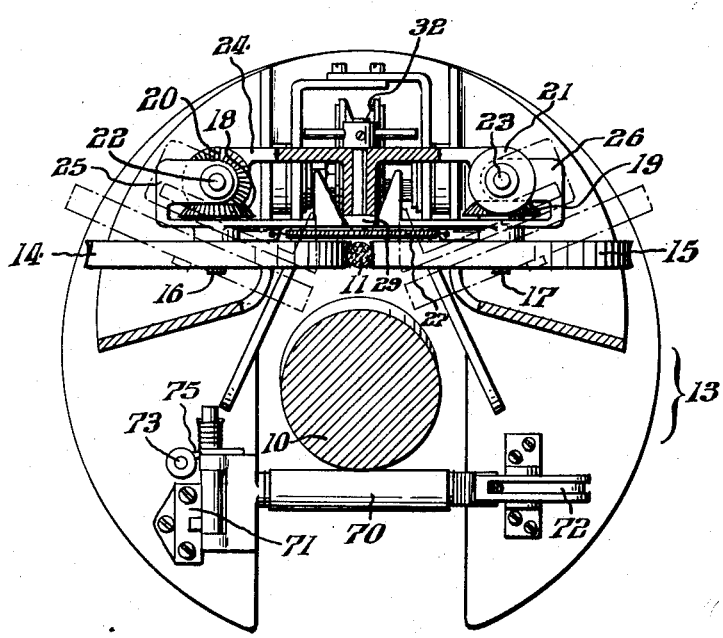
Fig. 2 is a front elevation taken along the lines II—II of Fig. 1.

Drive wheels 14 and 15 are connected through brackets 25 and 26 which are joined by coil spring 27 which tends to draw the drive wheels into a common plane on opposite sides of supporting strand 11. Brackets 25 and 26 are separated by release lever 29 which is so constructed that when it is rotated in the same plane as the drive wheels 14 and 15 it causes the brackets 25 and 26 to move downward thereby causing the drive wheels 14 and 15 to rotate about their respective drive shafts 23 and 22. It will be noted that when this is done drive wheels 14 and 15 will be disengaged from the strand 11 as illustrated in dot-dash in Fig. 2. When the release lever 29 is rotated to its original position drive wheels 14 and 15 are drawn back into the engaged position with the strand 11 by spring 27. The release lever 29 is rotatably mounted in bracket 28 which in turn is connected with bracket 24 which is mounted on the drive shafts 23 and 22. As shown in Fig. 2, the wheels 14 and 15 are slightly tapered to enable them to be drawn up against strand 11 by spring 27. Brackets 25 and 26 are so constructed that their inner ends nearest strand 11, being tapered automatically, that when release lever 29 is turned it rides along the inner faces of brackets 25 and 26 as a cam forcing them in a downward direction. By means of wheels 14, 15 and 32 a positive drive is provided to the rotating drum 12. The spacing along strand 11 of the two drive means assures rotation regardless of irregularities in the strand 11 or in the towing force. It is an important consideration that none of the drive means ride below strand 11, so that the machine may be placed directly on strand 11 without interference from the drive mechanism.

Along the inner side of the bevel gear 37 is mounted a ratchet 41, pawl 42 is pivotally mounted to the frame 13 so as to engage the ratchet 41 and prevent the rotation of the bevel gear and the drum 12 in a direction opposite to the operating direction of rotation.

Figure 3:
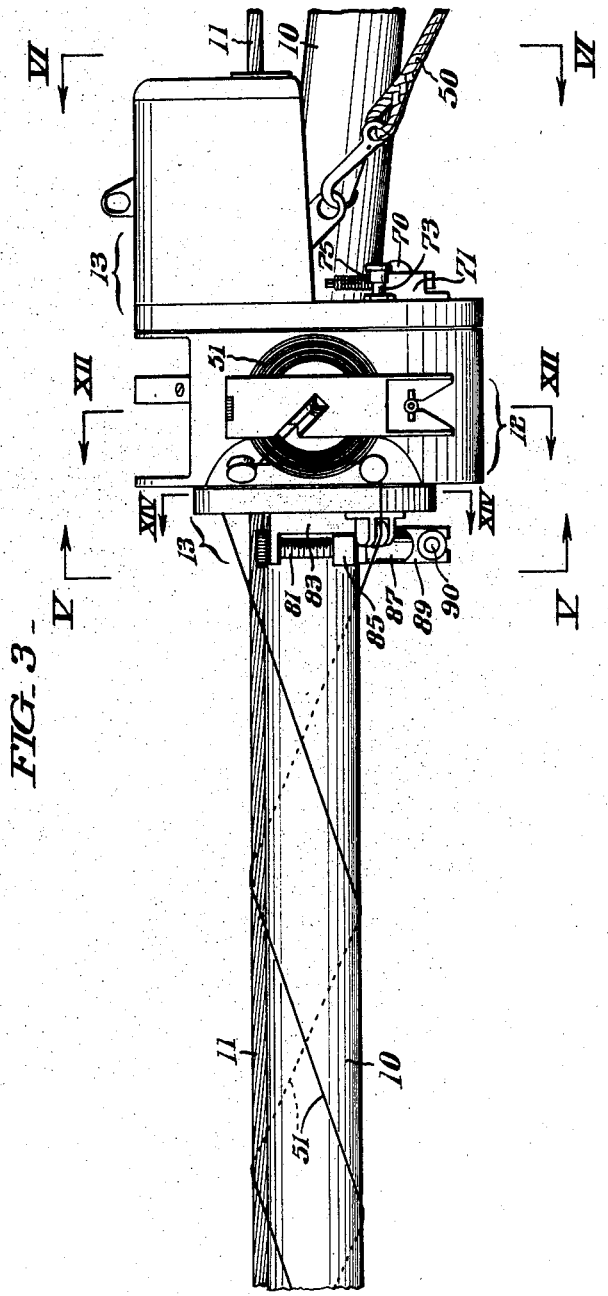
Fig. 3 is a side elevation of a modified form of the machine of Fig. 1.

As shown in Fig. 3 when the machine is mounted on strand 11 and the telephone cable 10 it is pulled along by rope 50 or some other suitable towing means. The lashing wire 51 is mounted on a reel on drum 12 and is payed out to the rear of the machine and moved about cable 10 and strand 11 as the machine moves forward and drum 12 rotates about frame 13.

Figure 4:
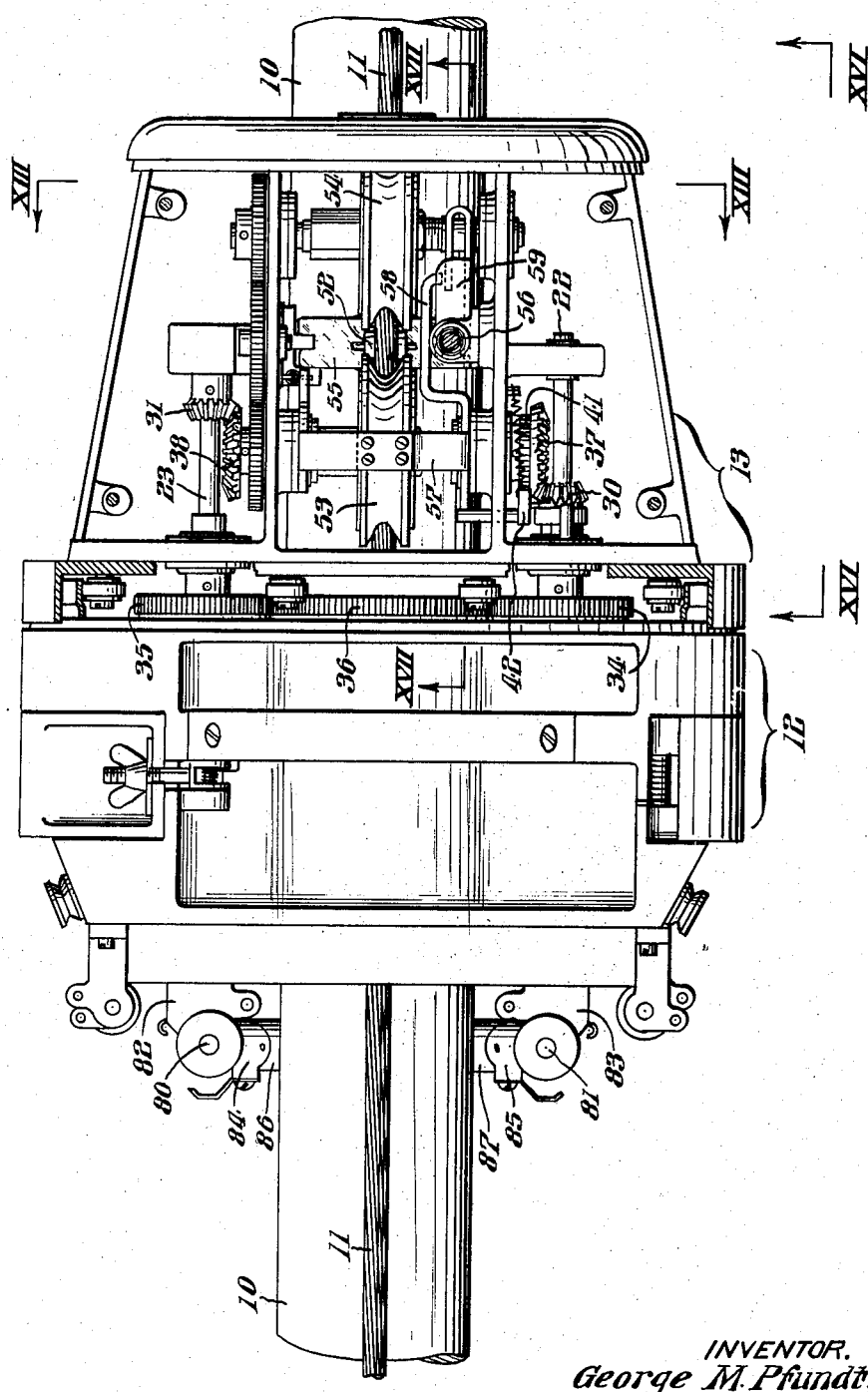
Fig. 4 is a plan view partly cut away of the cable lashing machine of Fig. 3.

Fig. 4 shows a modified form of the invention in which the drive traction is enhanced by means of a roller 52 mounted on the frame 13 beneath and between drive wheels 53 and 54. As shown in greater detail in Figs. 13, 15, 16 and 17 the roller 52 is mounted on bracket 55 which is vertically slideable with respect to frame 13. The bracket 55 is normally urged upward against the strand 11 by coil spring 56. It is assisted in this when the machine is being pulled forward along the strand 11 by rope 50 by the structure shown in Figs. 16 and 17. When the machine is being towed as shown in Fig. 17, the coil spring 56 is extended and placed in tension. Bracket 57, which is pivotally mounted on the axle of drive wheel 53, has an extended lug 58 which releasably connects with bracket 59 which is pivotally mounted on the axle of drive wheel 54 and which engages the stop 60 mounted on bracket 55. It will be apparent that when the machine is drawn forward along strand 11 the bracket 57 will rotate in a counter clockwise direction forcing the lug 58 and bracket 59 upward against stop 60 and thus forcing the bracket 55 upward and the roller 52 against strand 11. When the forward pull on the machine is released bracket 57 rotates in a clockwise direction lowering the lug 58, releasing bracket 59 and permitting stop 60 and bracket 55 to drop in response to the tension of spring 56 thus returning roller 52 to its normal engagement with strand 11. It will be noted, as illustrated in Fig. 15 in dot and dash lines that the bracket 55 may be pivoted out of engagement with strand 11 when the forward pull on the machine is released.

The front cable lifting assembly of the machine is illustrated in detail in Figs. 6, 7, and 8. The cable roller 70 is mounted on bracket 71 which is pivotally attached to the frame 13. Latch 72 at the other end of roller 70 is constructed to be locked to the frame 13. Integrated with this assembly is pin 73 which is spring mounted in frame 13 and positioned to enter opening 74 in the rotating drum 12. It will be apparent that when the pin 73 is inserted in opening 74 the drum 12 will be unable to rotate with respect to frame 13. When roller 70 is in its closed position and ready for operation, finger 75 urges pin 73 away from opening 74 and from drum 12. When the roller 70 is in its open position as shown in Fig. 8 finger 75 releases pin 73 permitting it to enter opening 74 in drum 12.

At the rear of the machine is provided a cable lifting assembly for lifting the cable 10 substantially into contact with the strand 11. A pair of vertically threaded rods 80 and 81 are rotatably mounted in brackets 82 and 83 respectively. Threaded blocks 84 and 85 are mounted on rods 80 and 81 respectively and are adapted to move upward or downward in response to the rotation of the rods. Roller 86 is rigidly attached to block 84 and roller 87 to block 85 as shown in Fig. 5. The rollers 86 and 87 extend toward each other at an angle as shown in the drawings. The exact size of the angle formed by rollers 86 and 87 is not vitally important to the success of the invention, but an angle of about 130° is satisfactory. For most purposes it is essential that the angle between the rollers 86 and 87 be less than 180° so that they do not lie in a straight line. On the other hand the angle should not be so small as to limit the approachability of the rollers 86 and 87 to the strand 11. Rollers 86 and 87 are joined by abutting plates 88 and 89 respectively and the hinged threaded rod 90 as shown in Figs. 9 and 10. The rollers 86 and 87 may be separated by rotating them about rods 80 and 81 respectively. By means of adjustable rollers 86 and 87 cable 10 of any standard size may be accommodated in the cable lashing machine and drawn upward substantially into contact with the strand 11. The angle between rollers 86 and 87 tends to maintain cable 10 in a relatively fixed position under the strand regardless of the size of the cable 10. The vertical adjustability as shown in Fig. 5 in dot-dash makes it possible to accommodate smaller sizes of cable.

A further modification of the invention is illustrated in Figs. 18 and 19 in which the front supporting wheels 95 and 96 are provided with a magnetic core 97 which causes the wheels 95 and 96 to adhere to the strand 11. The magnetic core 97 is protected by a surrounding cylinder 98 which may be of any durable formable material such as neoprene or the like. In this construction the shafts 99 and 100 must be of a non-magnetic material which is permanently non-magnetic. The core material 97 may be of any permanently magnetic material such as Alnico.

Many variations may be made in the various elements of the specific embodiments of the invention described herein without departing from the spirit of the invention as defined by the following claims.

Having thus described my invention, I claim:

1. A cable lashing machine having a pair of aligned front drive wheels for supporting said machine on a strand, roller means slidably mounted on said machine and disposed on the side of said strand opposite the front drive wheels, and means pivotally mounted on the axles of said front drive wheels for forcing said roller means against the strand without applying any force on either of said drive wheels forcing them away from said strand when the machine is moved forward along the strand.

2. A cable lashing machine having a pair of aligned front drive wheels for supporting said machine on a strand, roller means slidably mounted on said machine and disposed on the side of said strand opposite the front drive wheels, lug means fixed to said roller means and forcing means pivotally mounted on the axles of said front drive wheels for forcing said roller means against the strand when the machine is moved forward along the strand, said forcing means comprising a first bracket mounted on the axle of the first front drive wheel adapted to meet said lug on said roller means, a second bracket mounted on the axle of the second front drive wheel adapted to meet said first bracket and to force it up against said lug and means for rotating said second bracket about its axle.

3. A cable lashing machine comprising a frame, a drum rotatably mounted on said frame, a pair of drive wheels mounted on said frame for supporting the front portion thereof on a strand, a slidable bracket slidably mounted on said frame alongside and substantially between said drive wheels, a roller mounted in said slidable bracket on the side of the strand opposite said drive wheels, yieldable means for urging said slidable bracket and said roller toward said strand, a pivotal bracket pivotally mounted on the axle of each of said drive wheels, stop means on said slidable bracket for engaging one of said pivotal brackets and means for urging said pivotal brackets against said stop to urge said roller into positive engagement with the strand when said machine is moved along the strand.

References Cited in the file of this patent

UNITED STATES PATENTS 304,488    Barney                Sept. 2, 1884

(Other references on following page)

UNITED STATES PATENTS

| | | |
|---|---|---|
| 350,078 | Pendleton | Sept. 28, 1886 |
| 387,992 | Pendleton | Aug. 14, 1888 |
| 1,737,360 | Disbro | Nov. 26, 1929 |
| 1,812,961 | Kent | July 7, 1931 |
| 2,153,072 | Bookout et al. | Apr. 4, 1939 |
| 2,272,253 | St. John | Feb. 10, 1942 |
| 2,360,237 | Kent | Oct. 10, 1944 |
| 2,486,273 | Gibson | Oct. 25, 1949 |
| 2,592,943 | Neale | Apr. 15, 1952 |
| 2,632,199 | Rissler | Mar. 24, 1953 |
| 2,663,544 | Harley | Dec. 22, 1953 |

FOREIGN PATENTS

| | | |
|---|---|---|
| 506 | Great Britain | of 1875 |